(12) United States Patent
Lee et al.

(10) Patent No.: US 12,554,413 B2
(45) Date of Patent: Feb. 17, 2026

(54) OPERATING METHOD FOR STORAGE CONTROLLER AND STORAGE SYSTEM INCLUDING SAME

(71) Applicant: SAMSUNG ELECTRONICS CO., LTD., Suwon-si (KR)

(72) Inventors: Jin Wook Lee, Seoul (KR); Dong Ouk Moon, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 47 days.

(21) Appl. No.: 17/994,169

(22) Filed: Nov. 25, 2022

(65) Prior Publication Data

US 2023/0266884 A1 Aug. 24, 2023

(30) Foreign Application Priority Data

Feb. 22, 2022 (KR) .................... 10-2022-0023057

(51) Int. Cl.
*G06F 3/06* (2006.01)
*G06F 11/10* (2006.01)

(52) U.S. Cl.
CPC .......... *G06F 3/0619* (2013.01); *G06F 3/0659* (2013.01); *G06F 3/0679* (2013.01); *G06F 11/1012* (2013.01)

(58) Field of Classification Search
CPC .... G06F 3/0619; G06F 3/0659; G06F 3/0679; G06F 11/1012; G06F 3/0614; G06F 11/1048; G06F 3/0604; G06F 3/0661; G06F 9/30043; G06F 11/3051; G06F 11/3058

USPC ......................................................... 711/103
See application file for complete search history.

(56) References Cited

U.S. PATENT DOCUMENTS

| | | |
|---|---|---|
| 7,613,975 B2 | 11/2009 | Jibry et al. |
| 9,798,629 B1 | 10/2017 | Shilane et al. |
| 10,943,634 B2 | 3/2021 | Jung |
| 11,023,138 B2 | 6/2021 | Navon et al. |
| 11,275,646 B1 * | 3/2022 | Nguyen ................. G06N 3/088 |

(Continued)

FOREIGN PATENT DOCUMENTS

| KR | 20200023756 A | 3/2020 |
|---|---|---|
| KR | 20200130008 A | 11/2020 |

*Primary Examiner* — Jared I Rutz
*Assistant Examiner* — Wei Ma
(74) *Attorney, Agent, or Firm* — Fish & Richardson P.C.

(57) ABSTRACT

An operating method for a storage controller in a storage system including a non-volatile memory (NVM) may include; receiving a write command defining a write operation in accordance with a predictable latency mode of the storage system that defines a deterministic window and a non-deterministic window, determining whether the write operation is performed during the deterministic window or the non-deterministic window, upon determining that the write operation is performed during the non-deterministic window, performing the write operation using a normal write mode, upon determining that the write operation is performed during the deterministic window, analyzing a metric associated with the NVM to generate metric analysis results, selecting a write operation approach from among a plurality of write operation approaches in response to the metric analysis results to define a selected write operation approach, and performing the write operation using the selected write operation approach.

12 Claims, 10 Drawing Sheets

(56) References Cited

U.S. PATENT DOCUMENTS

| | | | |
|---|---|---|---|
| 11,513,720 B1* | 11/2022 | A | G06F 3/0658 |
| 2009/0003058 A1* | 1/2009 | Kang | G11C 16/3454 |
| | | | 365/185.18 |
| 2012/0155167 A1* | 6/2012 | Uehara | G11C 11/5628 |
| | | | 365/185.03 |
| 2015/0205527 A1* | 7/2015 | Cohen | G11C 29/52 |
| | | | 711/103 |
| 2017/0255515 A1* | 9/2017 | Kim | G06F 3/0619 |
| 2019/0042150 A1* | 2/2019 | Wells | G06F 3/0611 |
| 2020/0004456 A1* | 1/2020 | Williams | G06F 3/0679 |
| 2021/0043261 A1* | 2/2021 | Yu | G11C 13/0035 |
| 2021/0208812 A1 | 7/2021 | Benisty et al. | |
| 2022/0027268 A1* | 1/2022 | Dorsey | G06F 3/0655 |
| 2022/0415407 A1* | 12/2022 | Kim | G11C 16/3431 |
| 2023/0147294 A1* | 5/2023 | Sreedhar | G06F 3/0635 |
| | | | 711/103 |
| 2023/0161482 A1* | 5/2023 | Vyas | G06F 3/0653 |

\* cited by examiner

DTWIN : Deterministic Window
NDWIN : Non-Deterministic Window

OPERATING METHOD FOR STORAGE CONTROLLER AND STORAGE SYSTEM INCLUDING SAME

CROSS-REFERENCE TO RELATED APPLICATION

This application claims priority under 35 U.S.C. 119 from Korean Patent Application No. 10-2022-0023057 filed on Feb. 22, 2022 in the Korean Intellectual Property Office, the subject matter of which is hereby incorporated by reference in its entirety.

BACKGROUND

Technical Field

The inventive concept relates generally to storage controllers and storage systems. More particularly, the inventive concept relates to operating methods for storage controllers and storage systems including same.

Description of the Related Art

Flash memory is a type of nonvolatile memory that stores data by changing a threshold voltage of memory cells and reads data in relation to one or more read voltage levels. Flash memory is used in many applications benefiting from non-volatile data storage, low power consumption and high integration density.

Many contemporary and emerging solid state drives (SSDs) are implemented using flash memory. In this regard, SSDs have been successfully used to implement a variety of servers, user devices, data centers, etc. Interfaces associated with SSDs should provide optimal data access speeds and excellent reliability. A number of technical standards have been promulgated across the electronics industry seeking to facilitate product compatibility and improve device and system performance. For example, the Serial Advanced Technology Attachment (ATA) or SATA, Peripheral Component Interconnect express (PCIe), Serial Attached Small Computer System Interface (SCSI) or SAS, and Non-Volatile Memory express (NVMe) are ready examples of commercially available and conventionally understood technical standards.

SUMMARY

An object of the inventive concept is to provide a storage system in which a data recovery time and correction capability are optimized in accordance with a degradation state of a non-volatile memory in a predictable latency mode (PLM).

Another object of the inventive concept is to provide an operating method of a storage controller that provides high data reliability in accordance with a degradation state of a non-volatile memory even at a deterministic window.

In one embodiment, the inventive concept provides an operating method for a storage controller in a storage system including a non-volatile memory (NVM). Here, the operating method includes; receiving a write command defining a write operation in accordance with a predictable latency mode of the storage system that defines a deterministic window and a non-deterministic window, determining whether the write operation is performed during the deterministic window or the non-deterministic window, upon determining that the write operation is performed during the non-deterministic window, performing the write operation using a normal write mode, upon determining that the write operation is performed during the deterministic window, analyzing a metric associated with the NVM to generate metric analysis results, selecting a write operation approach from among a plurality of write operation approaches in response to the metric analysis results to define a selected write operation approach, and performing the write operation using the selected write operation approach.

Here, the plurality of write operation approaches may include, for example, one or more of an acceleration write mode using write data compression, a single level write mode, a multi-level write mode, a lower level cell write mode, a higher level cell write mode, a compressed write mode, and a normal write mode.

In another embodiment, the inventive concept provides an operating method for a storage controller in a storage system including a non-volatile memory (NVM). Here, the operating method includes; receiving a read command defining a read operation in accordance with a predictable latency mode of the storage system that defines a deterministic window and a non-deterministic window, performing the read operation during the deterministic window to generate read data, upon determining that the read data includes a correctable error, performing a normal error correction code (ECC) recovery operation on the read data, and upon determining that the read data includes an uncorrectable error, analyzing a metric associated with the NVM to generate metric analysis results, selecting a read recovery approach from a plurality of read recovery approaches in response to the metric analysis results, and performing a read recovery operation on the read data using the selected read recovery approach.

In still another embodiment, the inventive concept provides a storage system including; a non-volatile storage device, and a storage controller configured to control execution of memory access operations by a non-volatile memory (NVM) during a deterministic window defined in relation to a predictable latency mode of the storage system defining the deterministic window and a non-deterministic window. The storage controller is further configured to analyzes a metric corresponding to the memory access operation for the first data or the second data, and operates in an optimal memory access operation of a plurality of memory access manners, which corresponds to the analyzed metric.

BRIEF DESCRIPTION OF THE DRAWINGS

Advantages, benefits and features, as well as the making and use of the inventive concept, may be better understood upon consideration of the following detailed description together with the accompanying drawings, in which.

DETAILED DESCRIPTION

Throughout the written description and drawings, like reference numbers and labels are used to denote like or similar elements, components, features and/or method steps.

Figure 1:
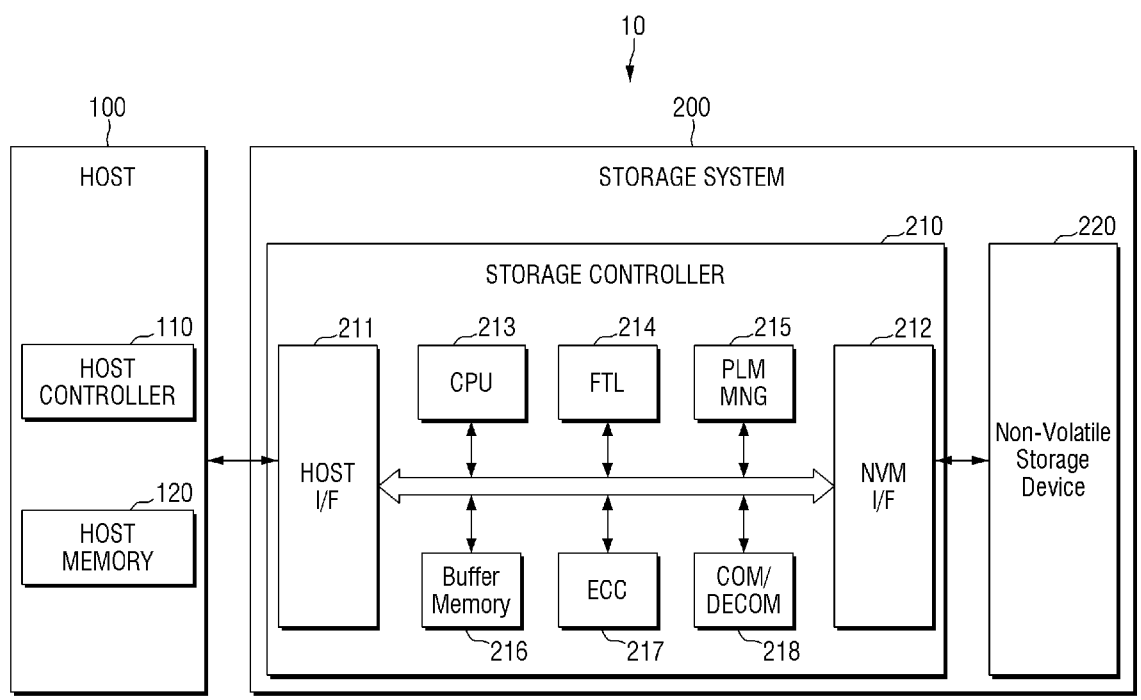
FIG. 1 is a block diagram illustrating a host-storage system according to embodiments of the inventive concept.
Figure 2:
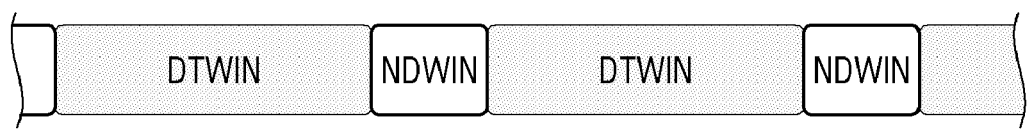
FIG. 2 is a timing diagram illustrating a predictable latency mode (PLM) for a storage system.

FIG. 1 is a block diagram illustrating a host-storage system 10 according to some embodiments of the inventive concept; FIG. 2 is a timing diagram illustrating a predictable latency mode (PLM) that may be implemented by the storage controller 200 of FIG. 1; and FIG. 3 is a block diagram further illustrating in one example the PLM management module 215 of FIG. 1.

Figure 3:
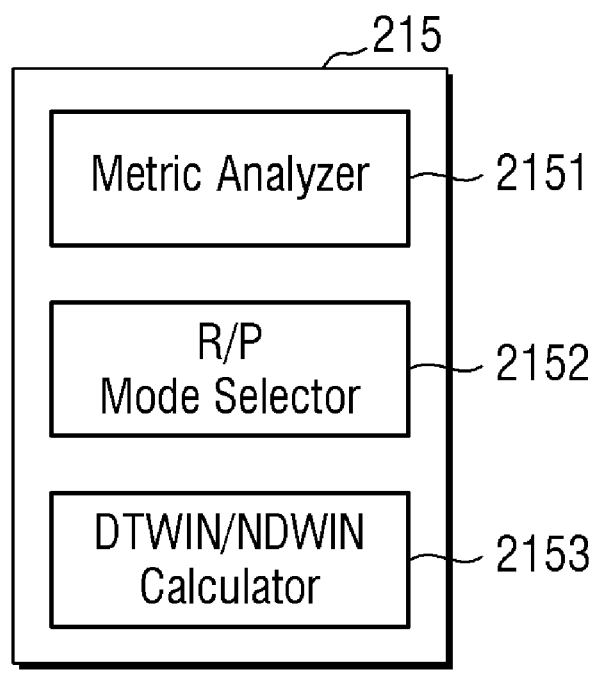
FIG. 3 is a block diagram further illustrating in one example the PLM management module 215 of FIG. 1.

Referring to FIGS. 1, 2 and 3, the host-storage system 10 may generally include a host 100 and a storage system 200.

The host 100 includes a host controller 110 and a host memory 120. Here, the host memory 120 may serve as a buffer memory that temporarily stores write data transmitted to the storage system 200 during a write (or program) operation and/or read data received from the storage system 200 during a read operation.

The storage system 200 includes storage media capable of storing or providing data in response to a request received from the host 100. In the illustrated example of FIG. 1, the storage system 200 includes a storage controller 210 and a non-volatile memory device (NVM) 220.

In some embodiments, the storage system 200 may include at least one of a solid state drive (SSD), an embedded memory, and a detachable external memory. Assuming that the storage system 200 includes a SSD as the NVM 220, the storage system 200 may operate in accordance with the Non-Volatile Memory express (NVMe) standard. Alternately, assuming that the storage system 200 includes an embedded memory or a detachable external memory, the storage system 200 may operate in accordance with the Universal Flash Storage (UFS) standard or the embedded Multi-Media Card (eMMC) standard. However, those skilled in the art will recognize that these are just selected examples of NVM types and related technical standards that may be used to implement the storage system 200.

Regardless of particular type of NVM, the host 100 and the storage system 200 may be configured to generate and communicate (e.g., transmit and/or receive) various data packets. That is, the host 100 and the storage system 200 may communicate various command(s) and/or control signal(s), address(es) and/or data (hereafter, singularly or in any combination, "CAD signals") using packets configured in accordance with one or more protocols associated with one or more technical standards.

When the NVM 220 of the storage system 200 includes flash memory, the flash memory may be configured as a two-dimensional (2D) NAND memory array or a three-dimensional (3D) (or vertical) NAND (VNAND) memory array. Alternately or additionally, the NVM 220 of the storage system 200 may include a magnetic random access memory (RAM) (MRAM), a spin-transfer torque MRAM, a Conductive Bridging RAM (CBRAM), a Ferroelectric RAM (FeRAM), a Phase-change RAM (PRAM), a Resistive RAM (RRAM), etc.

In some embodiments, each of the host controller 110 and the host memory 120 may be implemented as a separate semiconductor chip. Alternately, the host controller 110 and the host memory 120 may be commonly integrated within the same semiconductor chip.

The host controller 110 may include one or more modules provided by an application processor, wherein the application processor may be implemented as a system-on-chip (SoC). Here, the host controller 110 may be used to generate and manage write data to-be-communicated to the storage system 200 during a write operation. The host controller 110 may also be used to receive and manage read data from the storage system 200 during a read operation.

In some embodiments, the host memory 120 may include an embedded memory associated with the application processor, and/or may a NVM (e.g., a memory module) external to the application processor.

The storage controller 210 may include a host interface (I/F) 211, a memory I/F 212, a central processing unit (CPU) 213, a flash translation layer (FTL) 214, a predictable latency mode (PLM) management module 215, a buffer memory 216, an error correction code (ECC) engine 217 and a compression/decompression (COM/DECOM) module module 218. Here, the storage controller 210 may also include a working memory (not shown) associated with the FTL 214.

The CPU 211 may be used to control operation of the foregoing, exemplary components during the execution of various memory access operations (e.g., read operations, write operations, erase operations and various housekeeping operations) by the storage system 200 in relation to the NVM 220.

The storage controller 210 may operate by selecting an optimal memory access operation in accordance with a metric and further in accordance with a deterministic window defined in relation to a defined predictable latency mode (PLM). For example, when read data resulting from an executed read operation includes one or more error(s), the storage controller 210 may analyze a metric in relation to a degree of performance degradation for the NVM 220, and then based on this metric analysis, the storage controller 210 may select an optimal read recovery operation approach to be used during the correction of the error(s). Alternately, when a write operation is deemed particularly urgent, the storage controller 210 may analyze a metric in relation to the write data, and then based on the metric analysis, select an optimal write operation approach.

In this regard, the term "approach" may be understood as a method, an operating mode and/or a control procedure by which a read recovery operation, a write operation, or some other memory access operation may be competently performed.

The host I/F 211 may be used to control communication of packets between the storage system 200 and the host 100 and the NVM I/F 212 may be used to control communication of packets between the storage controller 210 and the NVM 220. Here, various packets communicated between the host 100 and the host I/F 21 and packets communicated between the NVM 220 and the NVM I/F 212 may include CAD signals (e.g., various CAD information depending on the nature of the memory access operation). In this regard in some embodiments, the memory I/F 212 may implement a data communications protocol defined by one or more conventionally understood and commercially available technical standards, such as Toggle or the Open NAND Flash Interface (ONFI).

The flash translation layer 214 may be used to implement one or more memory management (or housekeeping) functions, such as address mapping, memory cell wear-leveling and garbage collection. Here, address mapping is a category of operations (e.g., mapping tables) used to correlate logical addresses received from the host 100 with corresponding physical addresses associated with the storage of in the NVM 220. Wear-leveling is a category of operations (e.g., balancing counts) preventing excessive degradation (or wear) of memory cells in one or more region(s) of the NVM 220. Garbage collection is a category of operations (e.g., valid data consolidation and memory block recycling) maximizing the availability of memory space in the NVM 220.

The PLM management module 215 may be used to control operation of the NVM 220, as the NVM 220 operates in accordance with a defined predictable latency mode. In this regard, description of a defined predictable latency mode (or "PLM mode") associated with read and write operations is set forth, for example, in Revision 1.4c of the NVMe technical standard.

In general, a PLM mode may be defined in relation to a read operation and/or a write operation performed by a storage system, wherein the definition and used of the PLM mode provides relatively more stable execution of memory access operations in response to various requests from a host device.

Referring to the illustrated example of FIG. 2, a PLM mode may be defined in relation to the NVM 220 of FIG. 1 to include alternating occurrences of a deterministic window and a non-deterministic window. Here, the "deterministic window" (DTWIN) may be understood as a period of time defined by a deterministic latency and during which memory access operation(s) or urgent background operation(s) related to the NVM 220 may be executed. The deterministic window may be defined (or "set") not to exceed a defined maximum latency value. The "non-deterministic window" (NDWIN) may be understood as a period of time defined by a non-deterministic latency and during which residual operation not finishing yet in the deterministic window and normal (or not-urgent) background (or housekeeping) operation(s) may be performed. In some definitions, a non-deterministic window may be further understood as following or being a subsequent window of the deterministic window.

In this regard, should a some memory access operation exceed a maximum latency value in a deterministic window, the PLM management module 215 may control residual execution of the some memory access operation (it also called, residual memory access operation) so that it may be executed during a following non-deterministic window. In this manner, the PLM management module 215 may allow complete (and stable) execution of a background operation by the NVM 220 by effectively adjusting the period (or a temporal allocation) of the following non-deterministic window.

For example, the PLM management module 215 may actively monitor the ongoing execution of a memory access operation in relation to its maximum latency value during the deterministic window, in order to generate a "residual latency time."

Referring to FIG. 3, in some embodiments, the PLM management module 215 may include a metric analyzer 2151, a read/program (R/P) mode selector 2152, and a window (e.g., DTWIN/NDWIN) time calculator 2153.

The metric analyzer 2151 may be used to analyze one or more metric(s) associated with (or indicating) a performance degradation of memory cells included in the NVM 220. Exemplary metrics in this regard may include; a Program/Erase (PE) cycle indicator, a read operation count value, a temperature associated with the storage system, a usage time, a resource, a read recovery execution time, a program execution time, a deterministic window time, and a deterministic window read/write value. Here, respective metrics may have different respective values, depending on corresponding degree(s) of performance degradation for memory cells of the NVM 220. In this regard, it has been observed that read data errors are relatively more likely to occur in sympathy with detectable degree(s) of memory cell degradation. For example, a program execution time (e.g., a write time (tPROG)) may increase, or a number of write operation fails may increase under the influence of increasing memory cell degradation. Hence, the metric analyzer 2151 may be used to monitor (or analyze) one or more metrics indicating a degree of performance degradation for memory cells of the NVM 220.

In some embodiments, the metric analyzer 2151 may be used to analyze one or more metric(s) upon determining that read data contains an uncorrectable error. Alternately, in some embodiments, the metric analyzer 2151 may be used to analyze one or more metric(s) upon determining that a write command overlaps (or—looking forward—will overlap) execution of an important (or urgent) background operation within the storage system.

The R/P mode selector 2151 may be used to identify (or distinguish) an operation performed, or an operation to-be-performed, during the PLM mode in relation to an operating mode the storage controller 210 (e.g., in relation to execution of a read operation or a program operation).

In one example, when the storage system 200 performs a read operation, the R/P mode selector 2151 may be used to select one of a plurality of read recovery operation approaches (e.g., methods) in response to analysis of a metric. Thereafter, the storage controller 210 may read data (e.g., perform a read operation) in accordance with the selected read recovery operation approach. In another example, when the storage system 200 performs a write operation, the R/P mode selector 2151 may be used to select one of a plurality of write operation approaches in response to analysis of a metric. Thereafter, the storage controller 210 may write data (e.g., perform a write or program operation) in accordance with the selected write operation approach. That is, the R/P mode selector 2151 may be used to rewrite the data previously written using a first selected write operation approach in accordance with a second (or different) write operation approach during a non-deterministic window.

The window time calculator 2153 may be used to monitor the operational timing of the storage controller 210, and determine a residual time value related to an ongoing operation in relation to a deterministic window and further in relation to an upcoming switch from the deterministic window to a following non-deterministic window. For example, assuming an illustrative case wherein the duration of a deterministic window is set to 10 (arbitrary time units), once elapsed time for a current operation reaches 6, a residual time value of 4 may be calculated in relation to the deterministic window. This residual time value of 4 may be compared with an expected time required for completion of the current operation. Additionally, the window time calculator 2153 may be used to monitor a read recovery execution time in relation to one or more metric(s), further in relation to a timing associated with a particular operation (e.g., a read execution time for a read operation or a program (write) execution time for a write operation), and still further in relation to a deterministic window time.

Referring to FIG. 1, the buffer memory 216 may be used to temporarily store write data to be programmed (or written) in the NVM 220 and/or read data retrieved from the NVM 220. The buffer memory 216 may be provided within, or external to, the storage controller 210.

The ECC engine 217 may be used to perform error detection and/or correction function(s) in relation to write data stored in the NVM 220 and/or read data retrieved from the NVM 220. For example, the ECC engine 217 may generate parity bits in relation to write data to-be-written in the NVM 220. The generated parity bits may then be stored in the NVM 220 together with the write data. Thereafter when the read data is read from the NVM 220, the ECC engine 217 may correct error(s) occurring in the read data using the parity bits, also read from the NVM 220 together with the read data. In this manner, corrected read data may be ensured.

In some embodiments, the ECC engine 217 may indicate to the PLM management module 215 whether or not the read data includes at least one error, and the degree (or number) of error(s) in the read data. In this regard, when the read data includes at least one error, the PLM management module 215 may analyze one or more metric(s) in accordance with the degree of error(s) included in the read data, select an optimal read recovery operation approach in response to the metric(s) analysis, and then re-read the read data using the optimal read recovery operation approach.

The compression/decompression module 218 may be used to compress write data written (or programmed) by the storage controller 210 in the NVM 220 during a write program. Thereafter, the compression/decompression module 218 may be used to decompress retrieved compressed data. Further, the compression/decompression module 218 may perform level adjustment or compression/decompression of the data under the control of the PLM management module 215. In some embodiments, when residual time is deemed sufficient to perform an ongoing write operation during a deterministic window, the compression/decompression module 218 may write the data using a higher level cell mode (e.g., triple level cell, quad level cell, etc.). Alternately, when residual is deemed insufficient to perform an ongoing write operation, the compression/decompression module 218 may write the data using a lower level cell write mode (e.g., double level cell mode or single level cell mode). In this regard, should data be written in the NVM 220 using a low level cell mode, the PLM management module 215 may thereafter rewrite (or migrate) the data previously written using a lower level cell write mode during a non-deterministic window using a higher level cell mode.

In some embodiments, when residual time is deemed sufficient to perform (or complete an ongoing) write operation during a deterministic window, the compression/decompression module 218 may adjust compression of the data such that the data are written using a decompressed mode. Alternately, when residual time is deemed insufficient, the compression/decompression module 218 may adjust compression of the data such that the data are written using a compressed mode. In this regard, when the data are written in the NVM 220 using the compressed mode, the PLM management module 215 may decompress the compressed data during a non-deterministic window (e.g., the following non-deterministic window) and rewrite the decompressed data.

Figure 4:
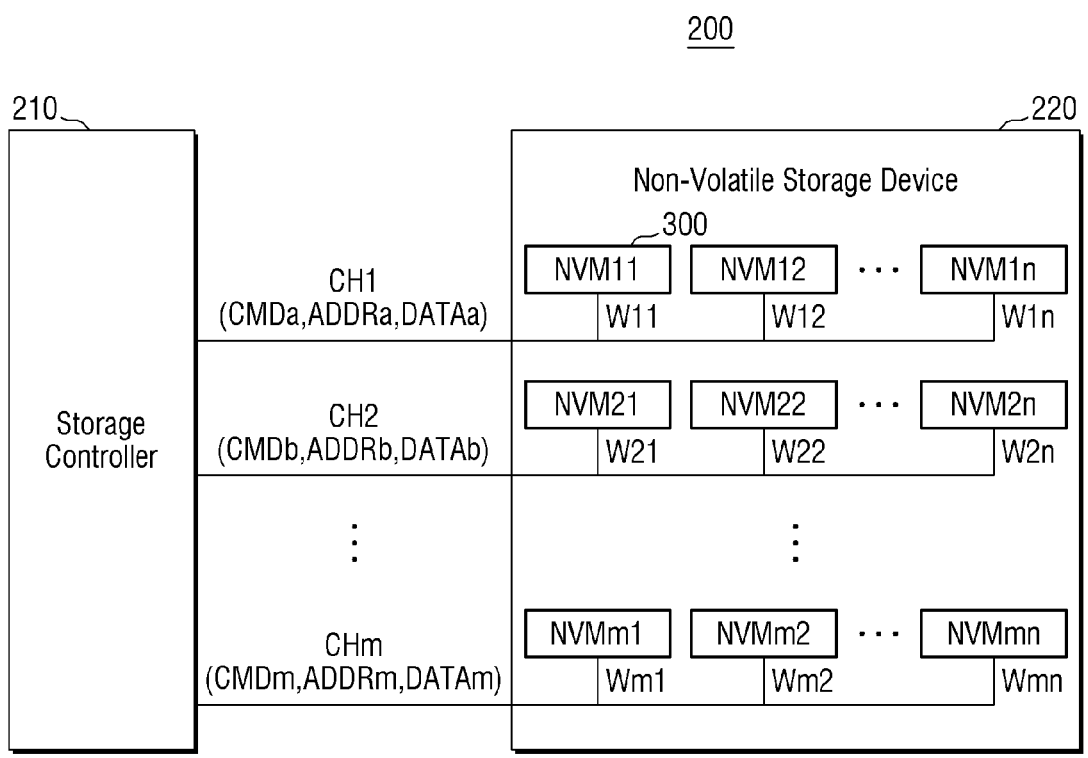
FIG. 4 is a block diagram further illustrating in one example the storage system 200 of FIG. 1.

FIG. 4 is a block diagram further illustrating in one example the storage system 200 of FIG. 1.

Referring to FIG. 4, the storage system 200 may include the storage controller 210 and the NVM 220, wherein the storage system 200 supports use of a plurality of channels (e.g., channels CH1, CH2, . . . CHm—hereafter, "CH1 to CHm"). Here, the storage controller 210 and the NVM 220 may be connected via the plurality of channels CH1 to CHm when the storage system 200 is implemented as a non-volatile storage device, such as a solid state drive (SSD).

The NVM 220 may include a plurality of non-volatile memory devices (e.g., NVM11 to NVMmn), wherein each of the non-volatile memory devices NVM11 to NVMmn 300 is respectively connected to one of the plurality of channels CH1 to CHm, and may be further arranged in Ways W11 to W1$n$. For example, non-volatile memory devices NVM11 to NVMmn may be connected to a first channel CH1 through ways W11 to W1$n$, and the non-volatile memory devices NVM21 to NVM2$n$ may be connected to a second channel CH2 through ways W21 to W2$n$.

Each of the non-volatile memory devices NVm11 to NVMmn 300 may be implemented in a random memory unit capable of operating in accordance with command(s) received from the storage controller 210. For example, each of the non-volatile memory devices NVM11 to NVMmn 300 may be implemented as a chip or a die, but the inventive concept is not limited thereto.

The storage controller 210 may communicate signals with the NVM 220 via the plurality of channels CH1 to CHm. For example, the storage controller 210 may communicate various CAD signals (e.g., commands CMDa to CMDm, addresses ADDRa to ADDRm, and data DATAa to DATAm) to the NVM 220 via the channels CH1 to CHm.

In its operation, the storage controller 210 may select one or more of the non-volatile memory devices NV11 to NVmn 300 and variously communicate one or more CAD signals via a corresponding channel. For example, the storage controller 210 may select the non-volatile memory device NVM11 from among the non-volatile memory devices NVM11 to NVM1$n$ connected to the first channel CH1, and communicate at least one of a command CMDa, an address ADDRa, and a data DATAa to the selected non-volatile memory device NVM11 through the first channel CH1.

In some embodiments, the storage controller 210 may communicate one or more CAD signals with the NVM 220 in parallel using two or more channels. For example, the storage controller 210 may communicate a command CMDb to the NVM 220 through the second channel CH2 while communicating the command CMDa to the NVM 220 through the first channel CH1.

As noted above, the storage controller 210 may be used to control the overall operation of the NVM 220. That is, the storage controller 210 may control each of the non-volatile memory devices NVM11 to NVMmn connected to the channels CH1 to CHm by communicating at least one CAD signal via the channels CH1 to CHm. For example, the storage controller 210 may control the non-volatile memory devices NVM11 by communicating the command CMDa and the address ADDRa via the first channel CH1.

Each of the non-volatile memory devices NVM11 to NVMmn 300 may operate under the control of the storage controller 210. For example, the non-volatile memory device NVM11 may program the data DATAa in accordance with the command CMDa, the address ADDRa and the data DATAa which provided via the first channel CH1, whereas the non-volatile memory device NVM21 may read the data DATAb in accordance with the command CMDb and the address ADDRb provided via the second channel CH2, and may communicate the read data DATAb to the storage controller 210 via the second channel CH2.

From the foregoing, it may be understood that the illustrated example of FIG. 4 assumes the non-volatile storage device 220 variously communicates with the storage controller 210 via 'm' channels, wherein the storage NVM 220 includes 'n' non-volatile memory devices corresponding to each channel. However, those skilled in the art will recognize that any reasonable number and arrangement of channels and non-volatile memory devices is contemplated within the scope of the inventive concept.

Figure 5:
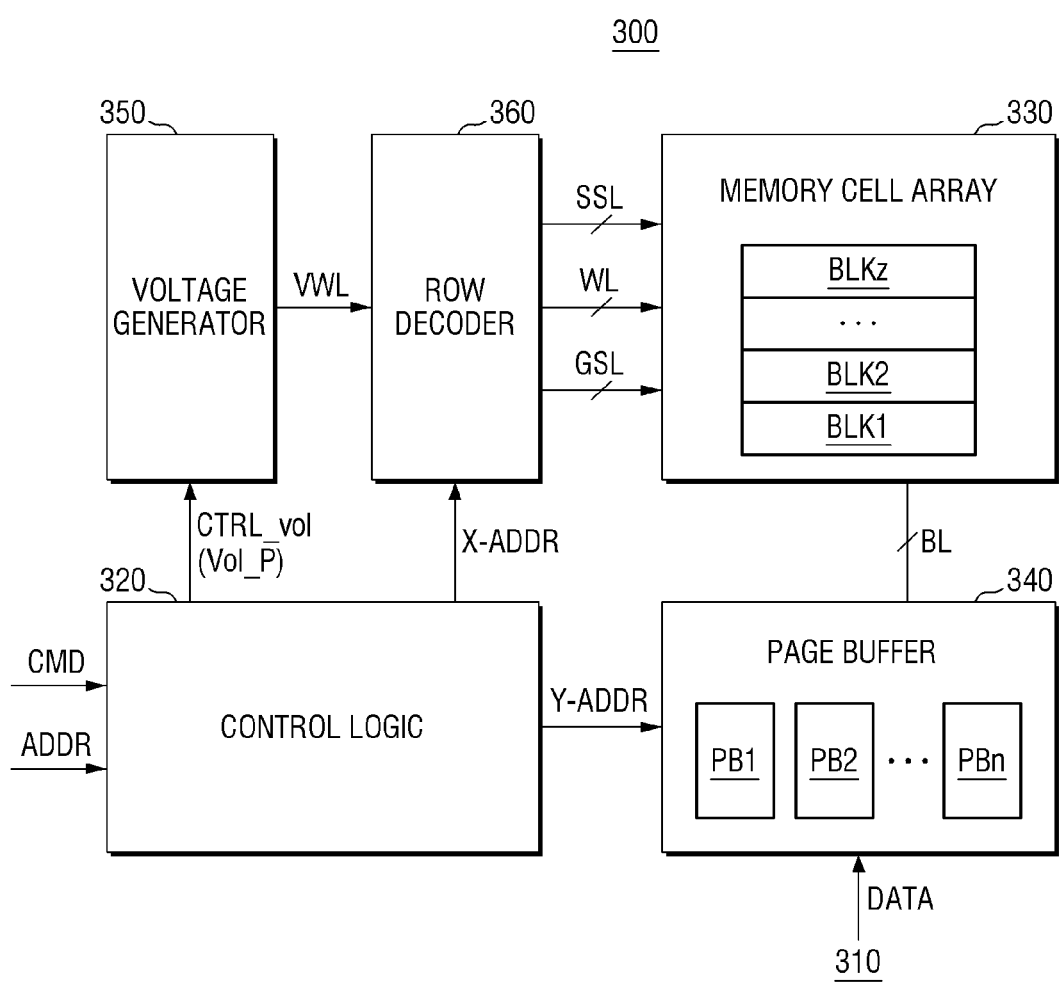
FIG. 5 is a block diagram further illustrating in one example the non-volatile memory devices 300 of FIG. 4.

FIG. 5 is a block diagram further illustrating at least one of the non-volatile memory devices 300 of FIG. 4.

Referring to FIG. 5, the non-volatile storage device 300 may include; a memory interface (I/F) circuit 310, a control logic circuit 320, a memory cell array 330, a page buffer 340, a voltage generator 350, and a row decoder 360. The non-volatile storage device 300 may further include in some embodiments a column logic, a pre-decoder, a temperature sensor, a command decoder, an address decoder, and the like.

The control logic circuit 320 may generally control various operations performed within the non-volatile storage device 300. The control logic circuit 320 may output various control signals in response to the command CMD and/or the address ADDR from the memory I/F circuit 310. For example, the control logic circuit 320 may output a voltage control signal CTRL_vol, a row address X-ADDR, and a column address Y-ADDR.

The memory cell array 330 may include a plurality of memory blocks BLK1 to BLKz, wherein 'z' is a positive integer, and each of the plurality of memory blocks BLK1 to BLKz may include a plurality of memory cells. The memory cell array 330 may be connected to the page buffer 340 through bit lines BL, and may be connected to the row decoder 360 through word lines WL, string selection lines SSL, and ground selection lines GSL.

In some embodiments, the memory cell array 330 may include a three-dimensional memory cell array, and the three-dimensional memory cell array may include a plurality of NAND strings. Each NAND string may include memory cells connected to word lines vertically stacked on a substrate. In this regard, the collective subject matter of U.S. Pat. Nos. 7,679,133; 8,553,466; 8,654,587, and 8,559,235, as well as published U.S. Patent Application No. 2011/0233648 is hereby incorporated by reference. In some embodiments, the memory cell array 330 may include a 2D memory cell array, wherein the 2D memory cell array includes a plurality of NAND strings disposed in a matrix of rows and columns.

The page buffer 340 may include a plurality of page buffers PB1 to PBn, wherein 'n' is an integer greater than 2, and the plurality of page buffers PB1 to PBn may be connected to the memory cells through the plurality of bit lines BL, respectively. The page buffer 340 may select at least one of the bit lines BL in response to the column address Y-ADDR. The page buffer 340 may operate as a write driver or a sense amplifier in accordance with an operation mode. For example, during a program operation, the page buffer 340 may apply a bit line voltage corresponding to data to be programmed to the selected bit line. During the read operation, the page buffer 340 may sense the data stored in the memory cell by sensing a current or voltage of the selected bit line.

The voltage generator 350 may be used to generate various voltages used during the execution of various background and memory access operations in response to the voltage control signal CTRL_vol. For example, the voltage generator 350 may generate a program voltage, a read voltage, a program verification voltage, an erase voltage, and the like as a word line voltage VWL.

The row decoder 360 may select one of the plurality of word lines WL in response to the row address X-ADDR, and may select one of the plurality of string selection lines SSL. For example, the row decoder 360 may apply the program voltage and the program verification voltage to the selected word line during the program operation, and may apply the read voltage to the selected word line during the read operation.

Figure 6:
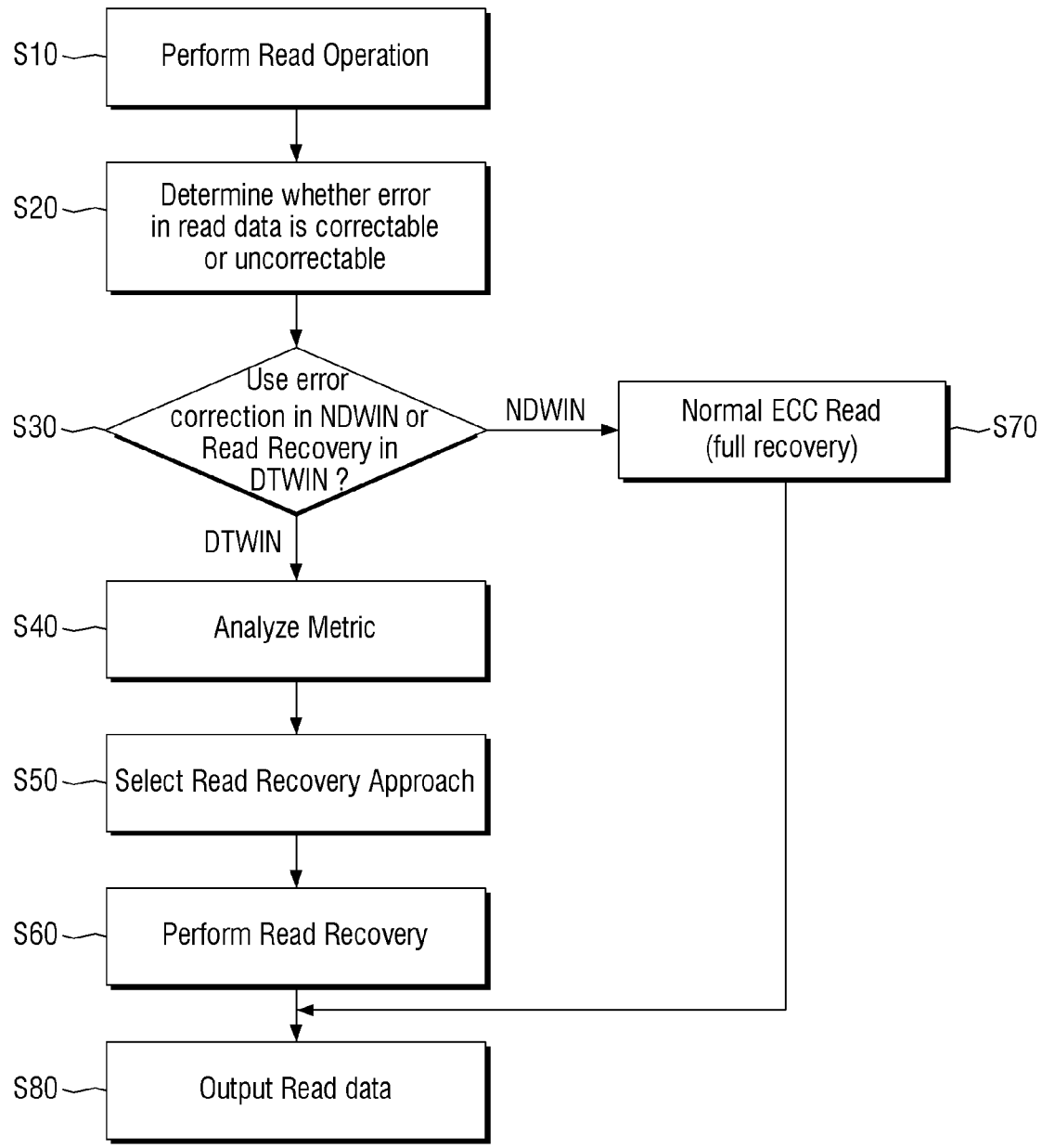
FIG. 6 is a flow chart illustrating an operating method for a storage system executing a read operation in PLM mode in accordance with embodiments of the inventive concept.
Figure 7:
FIG. 7 is a table listing exemplary read recovery levels associated with a PLM mode.
Figure 8:
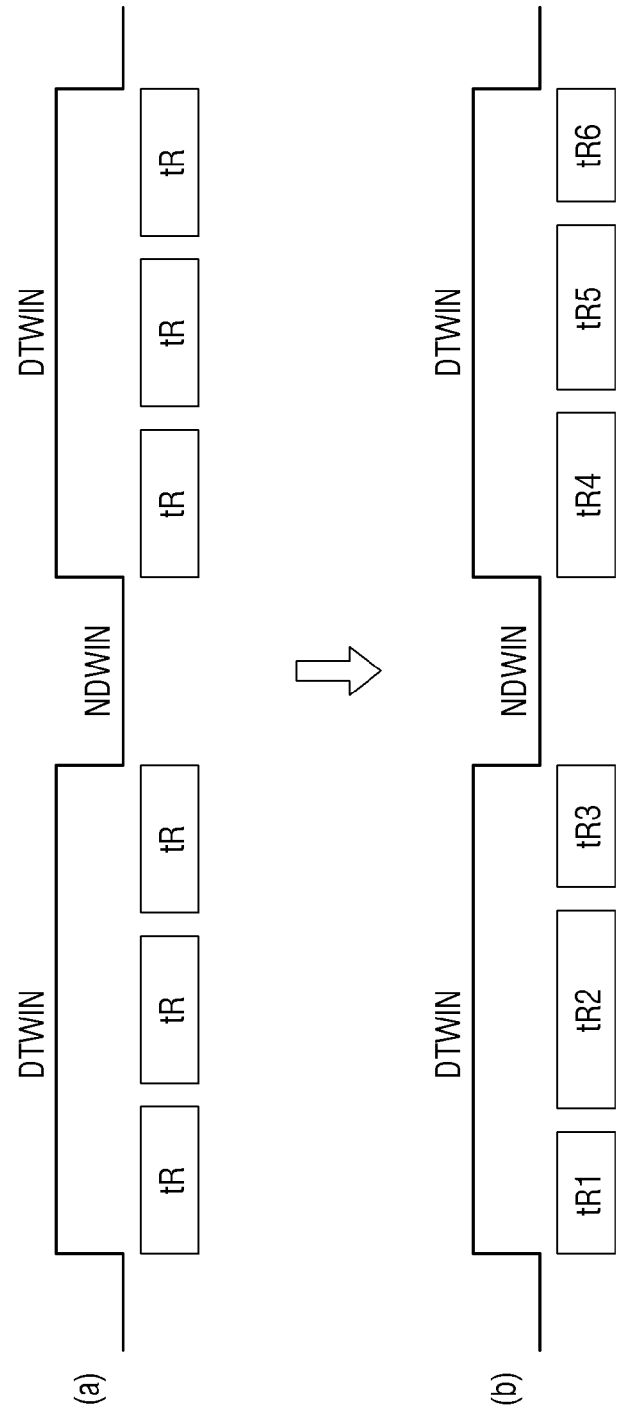
FIG. 8, including FIGS. 8(*a*) and 8(*b*), is a timing diagram further illustrating execution of a read operation in PLM mode in accordance with embodiments of the inventive concept.

FIG. 6 is a flow chart illustrating an operating method for a storage system executing a read operation while operating in a PLM mode according to embodiments of the inventive concept; FIG. 7 is a table listing exemplary read recovery levels that may be used during the PLM mode; and FIG. 8 is a timing diagram further illustrating in one example execution of the read operation in FIG. 6.

Referring to FIGS. 1, 6, 7 and 8, the storage controller 210 may read data from the NVM 220 (e.g., perform a normal read operation) in accordance with a defined predictable latency mode (PLM) associated with the storage system 200 (S10). For example, the storage controller 210 may perform a read operation in response to a read command received from the host 10. Alternately, the storage controller 210 may perform a read operation in response to an internally generated command (e.g., an internal command generated in response to a determination made by the CPU 213 of the storage controller 210).

Upon reading data from the NVM 220, the storage controller 210 may determine (or check) whether the read data includes one or more error(s), and whether the error is a correctable error or an uncorrectable error (S20).

In a case wherein the error is a correctable error, the ECC engine 217 may be used to correct the error in order to generate corrected read data. This type of normal ECC recovery operation may be performed during this deterministic window (DTWIN) or during a following non-deterministic window (NDWIN) and may fully recover the read data. (S70)

However, upon determining that the error is an uncorrectable error, the ECC engine 217 may determine (or check) whether the uncorrectable error occurred in the deterministic window (DTWIN) or the non-deterministic window (NDWIN)(S30) and indicate to the PLM management module 215 that the read data includes the uncorrectable error. When the uncorrectable error occurred in the non-deterministic window (NDWIN), the normal ECC recovery operation may be performed in the non-deterministic window (NDWIN).

That is, if the PLM management module 215 determines that the read operation resulted in an uncorrectable error being included in the read data, a normal ECC recovery operation may be performed (S70) during the non-deterministic window since there is no temporal restriction in latency. However, if the PLM management module 215 determines that the read operation resulted in an uncorrectable error being included in the read data during the deterministic window (DTWIN), the PLM management module 215 may analyze at least one metric associated with the storage system 200 (S40) since there may be a temporal restriction in latency. As noted above, the one or more metric(s) analyzed in this regard may be selected in relation to various attributes (e.g., operating states, performance degradation, degree(s) of degradation, etc.) associated with memory cells of the NVM 220. Ready examples of metrics that may be analyzed in relation to the NVM 220 include, for example; a program/erase (P/E) cycle, a read count, an operating temperature, memory cell location in a memory cell array, block location in the memory cell array, a specification value or limit, a usage time, a resource level or indication, a read recovery execution time, a program execution time, a deterministic window duration, and a deterministic window read/write value.

In this regard, the PLM management module 215 may be used to store a plurality of read recovery operation approaches in a memory or buffer associated with the storage system 200 (e.g., buffer memory 216 or NVM 220). The plurality of read recovery operation approaches may include, for example, a hard decision decoding approach, a soft decision decoding approach, an error correction approach determined by an ON-cell count, an error correction approach determined by an OFF-cell count, a soft decision decoding approach including several read operations performed at the same read level giving rise to the error(s), and a soft decision decoding approach including a read operation performed at a next level adjacent to (e.g., incrementally stepped in relation to) the read level giving rise to the error(s). For example, the PLM management module 215 may determine an ON-cell count for the read data, determine the uncorrectable error corresponding to the ON-cell count and select one of the sorted plurality of read recovery operation approaches in response to the uncorrectable error.

After analyzing the one or more metric(s) to generate corresponding "metric analysis results" (S40), the PLM management module 215 may select one of the stored plurality of read recovery operation approaches in response to the metric analysis results (S50). For example, the PLM management module 215 may select one of the read recovery operation approaches using a decision tree (e.g., a method or algorithm using a decision tree approach) responsive to the metric analysis results. Alternately, the PLM management module 215 may select one of the read recovery operation approaches using a machine learning method or system responsive to the metric analysis results.

In some embodiments, the PLM management module 215 may generate and store read recovery information associated with one or more metrics, wherein the read recovery information may be used to train (or pre-learn) a machine learning system. The read recovery information may include metric mapping information, read level offset information, etc. Alternately or additionally, the read recovery information may include computations associating one or more metrics with various read recovery operation approaches, or computations associating read level offsets for various read recovery operation approaches using one or more metric(s) as input(s) to the calculations.

Referring to FIGS. 6 and 7, in some embodiments, the read recovery information may be used to "map" (e.g., correlate) various read recovery levels (e.g., Level 0 to Level 15) in relation to one or more metric(s). Consistent with the NVMe 1.4 specification noted above by way of background information, a read recovery level may be specified according to each one of 16 levels. One of these Levels (e.g., Level 4) may be designated as a default (or basic) level, and another one of the Levels (e.g., Level 15) may be designated as an error correction failure. In some embodiments, the PLM management module 215 may label various metric(s) associated with different NVM attributes in order to store mapping information in relation to the labeled metric(s) and further in relation to various read recovery levels. In this regard, the mapping information may include arithmetic values calculated using machine learning, or values pre-stored in a mapping table, as calculated using machine learning. Further in this regard, the PLM management module 215 may select a read recovery level corresponding to metric analysis results (S50) generated in response to read recovery information.

Upon selecting a read recovery operation approach from among stored plurality of read recovery operation approaches (S60), the ECC engine 217 may be used to read data from the NVM 220 (e.g., perform a read operation in relation to the NVM 220) again using the selected read recovery operation approach (S80).

Referring to FIGS. 6 and 8, in some embodiments, an execution time by the selected read recovery operation approach (e.g., the time required for performing a read operation in accordance with the selected read recovery operation approach) may vary in accordance with a number of factors (e.g., the nature of the selected read recovery approach, the degree of error(s) in the read data, overall operational timing of the storage system 200, etc.).

In the illustrated example of FIG. 8, it is assumed that three data (e.g., first, second and third data) are read during a deterministic window (DTWIN). It is further assumed that reading of the first data requires as much as a first read time (tR1), reading of the second data requires as much as a second read time (tR2), and reading of the third data requires as much as a third read time (tR3). Here, however, the respective required read times for the first, second and third data may dynamically vary in relation to a number of factors including, for example; error type(s) in the read data, corrected/uncorrected nature of the read data, required error correction time, etc.

Accordingly, assuming no errors occur in data read from the NVM 220 (e.g., memory cells of the NVM 220 storing the first, second and third data are not materially degraded), a nominal (or default) read time (tR) may be assumed for reading the first, second and third data, as shown in FIG. 8(a). However, if any one of the memory cells of the NVM 220 storing the first, second and third data is degraded in its performance, or if an uncorrectable error occurs in the read data due to some other problem arising during the read operation, then one or more read times associated with a resulting read recovery operation may be varied. That is, since the PLM management module 215 is able to dynamically select a read recovery operation approach in relation to one or more metric(s), and then perform an optimal read recovery operation using the selected read recovery operation approach, any or all of the first read time tR1, the second read time tR2 and the third read time tR3 may be varied. In other words, a first time required for normal reading and recovery reading first data within the deterministic window is different from a second time required for normal reading and recovery reading second data. The second data is different with the first data within the deterministic window.

The illustrated example of FIG. 8(b) assumes that the second read time tR2 is varied to be longer than the first read time tR1 and the third read time tR3, as compared to the default case of FIG. 8(a), due to a different read recovery operation approach being selected in view of differing timing requirements for execution of the second read recovery operation.

For example, in some embodiments, the PLM management module 215 may monitor a residual time based on the elapsed time for operation(s) being executed within the deterministic window DTWIN. Thus, extending the example of FIG. 8 in relation to the determination of the third read time tR3, a residual time (t_residue) may be calculated by subtracting the first read time tR1 required to read the first data and the second read time tR2 required to read the second data from a total time allocated for the deterministic window DTWIN. If a third read request associated with reading of the third data indicates an expected third read time (tR3_request) that is less than or equal to the residual time (e.g., tR3_request≤t_residue), the third data may safely be read using the selected read recovery operation approach (FIG. 6, S50).

However, if the expected third read time (tR3_request) indicated by the third read request associated with the reading of the third data is greater than the residual time (e.g., tR3_request>t_residue), the storage controller 210 may not be able to safely read and output the third data read within the residual time. Accordingly, the storage controller 210 may perform a read recovery operation for the third data as a background operation and correction of the third data during a following non-deterministic window NDWIN. Alternately, when correcting the read third data (S60) after the metric(s) have been analyzed (S40), the storage controller 210 may determine (or check) information(s) to include at least one of the residual time, a location of memory cell storing the third data, and a time required to read an adjacent memory cell(s). Using this information, the PLM management module 215 may select a read recovery operation approach best suited (or optimized) in relation to the residual time in order to read the third data (S60) during the residual time.

As variously corrected according to the foregoing, corrected data resulting from execution of an optimal read recovery operation performed on data read from the NVM 220 may be provided (or output) to the storage controller 210 (S80). Thereafter, the storage controller 210 and buffer memory 216 may be used to output the corrected data to the host 10.

Thus, the storage controller 210 may improve read data reliability and provide a stable operating speed by performing a read recovery operation even when an uncorrectable error occurs in the targeted read data while determining a residual time associated with a deterministic window.

Figure 9:
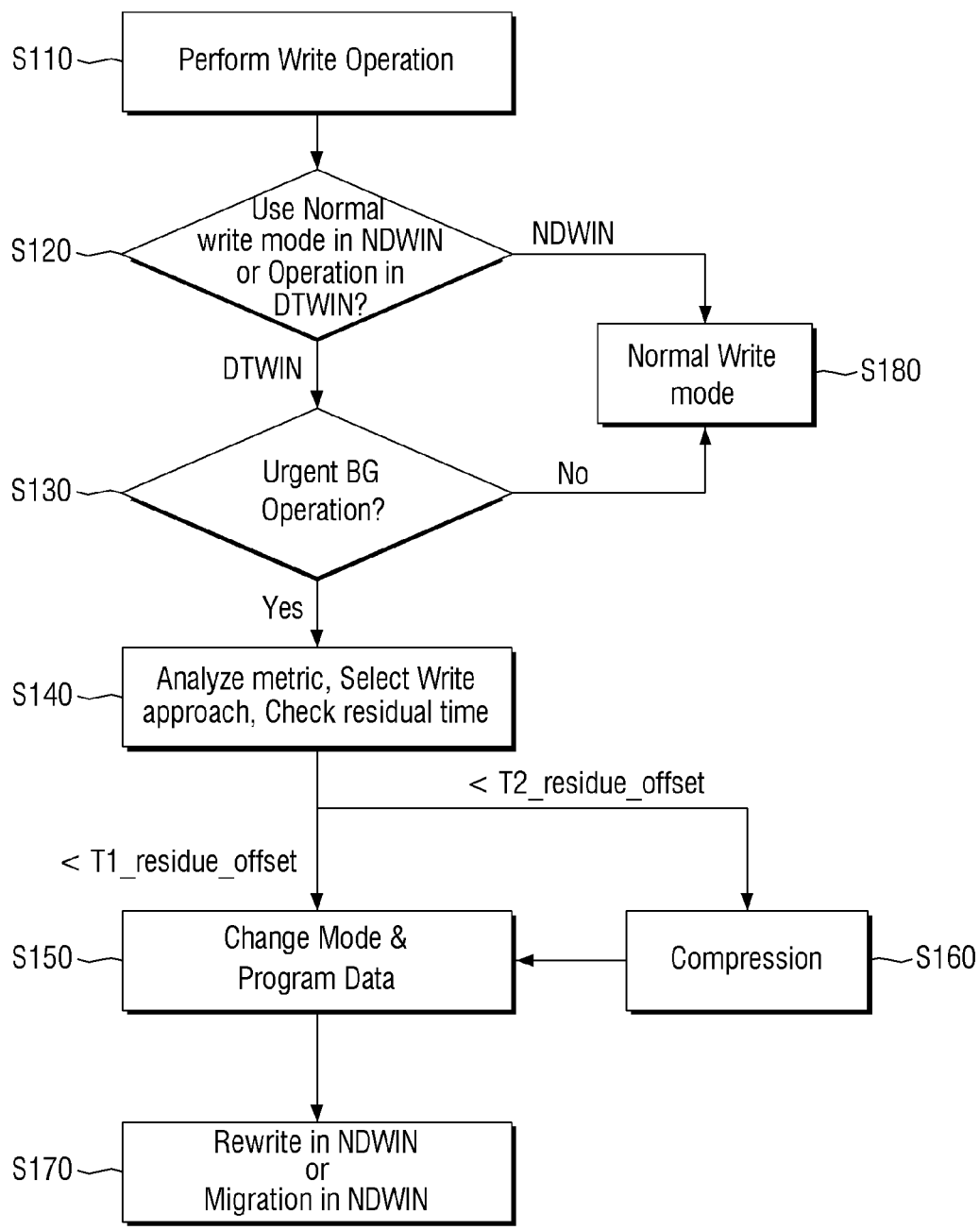
FIG. 9 is a flow chart illustrating an operating method for a storage system executing a write operation in PLM mode in accordance with embodiments of the inventive concept.
Figure 10:
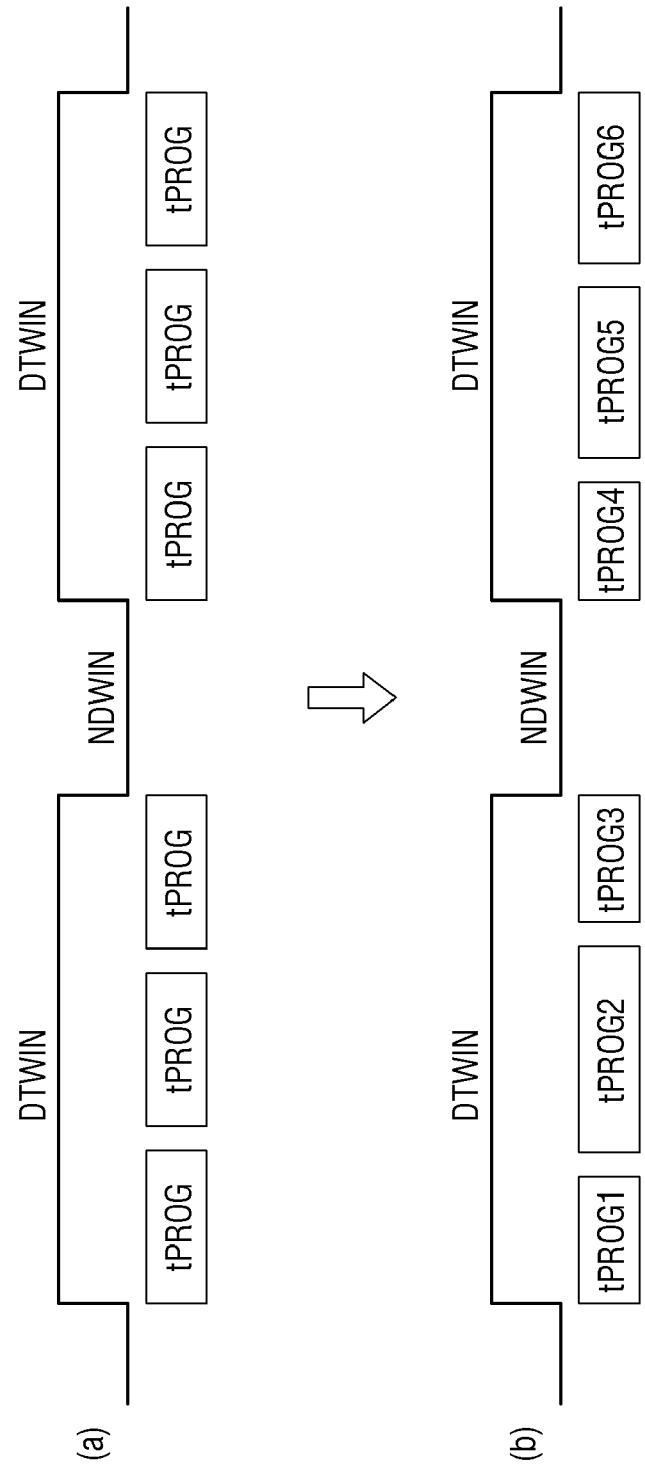
FIG. 10, including FIGS. 10(*a*) and 10(*b*), is a timing diagram further illustrating execution of a write operation in PLM mode in accordance with embodiments of the inventive concept.

FIG. 9 is a flow chart illustrating an operating method for a storage system executing a write operation in accordance with a defined PLM mode according to some embodiments of the inventive concept; and FIG. 10 is a timing diagram further illustrating in one example execution of the write operation of FIG. 9.

Referring to FIGS. 1 and 9, the storage system 200 may write (or program) data in the NVM 220 (S110). For example, the storage controller 210 may perform a write operation in response to a write command received from the host 10.

In some embodiments, the PLM management module 215 may determine whether the write operation is performed during the deterministic window (DTWIN) or the non-deterministic window (NDWIN), as defined by a defined predictable latency mode (S120). Upon determining that the write operation is performed in the non-deterministic window, the PLM management module 215 may perform the write operation using a normal write mode (S180) since there is no material temporal restriction in latency. Here, in some embodiments, the normal write mode may cause execution of a data write operation according to a higher level cell mode (e.g. a triple level cell write operation), a decompressed data write mode, etc.

Upon determining that the write operation is performed during the deterministic window, the PLM management module 215 may further determine whether an urgent background (BG) operation is pending for the NVM 220 (S130) before performing the write operation since there may be a time restriction in latency.

If no urgent background operation is pending (S130=No), the storage controller 210 may perform the write operation in accordance with the normal write mode (S180). However, if an urgent background operation is pending (S130=Yes), the storage controller 210 may (1) analyze one or more metrics associated with the NVM 220 to generate metric analysis results; (2) select a write operation approach in response to the metric analysis results; and/or check a residual time associated with execution of the write operation (S140). That is, the PLM management module 215 may select an optimal write operation approach in response to metric analysis results generated by analyzing the one or more metric(s), and thereafter perform the write operation according to the selected (optimal) write operation (S150 and S160).

In some embodiments, the PLM management module 215 may determine an offset level associated with a read retry operation in view of residue time and an internal operation determined in relation to the metric analysis results. For example, if the residual time is less than a first offset (residue<T1_residue offset), the residual time may be used to write data using a lower level cell write mode (e.g., a single level cell write mode or a multi-level cell write mode) write mode (S150). Alternately, if the residual time is less than a second offset during the deterministic window DTWIN (residue<T2_residue offset), the residual time may be deemed insufficient, as compared with a normal program execution time. Accordingly, the residue time may be used to write the data in the NVM 220 using a compressed write mode (S160). In some write operation approaches using a compressed write mode, data may first be stored (S150) as compressed data following compression (S160). Alternately, the compressed write mode may compress data (S160), store the compressed data in a buffer memory, and then write the compressed data in the NVM 220 according to a predetermined size (e.g., a data unit size calculated by the FTL 214 and communicated to the NVM 220) (S170). In this regard, the first and second offsets may be preset threshold times, and the second offset may be less (shorter) than the first offset (e.g., T1_residue offset>T2_residue_offset).

In accordance with various write operation approaches, the storage controller 210 may effectively rewrite the write data during the non-deterministic window using the normal write mode. In this regard, the storage controller 210 may transfer (or migrate) the write data using a high level cell mode. Alternately, in some embodiments, write data previously compressed may be decompressed during the non-deterministic window and rewritten using a high level cell mode (e.g., triple-level cell or quad-level cell) (S170).

Referring to FIGS. 1, 9 and 10, during the write operation (S150 and S160), the PLM management module 215 may monitor (or determine) a residual time based on an elapsed time associated with write operation execution during the deterministic window. Here, it is assumed that up to a first write time (tPROG1) may be required to program first data, up to a second write time (tPROG2) may be required to program second data, and up to a third write time (tPROG3) may be required to program third data.

During first, second and third write operations respectively associated with the first data, second data and third data, each write time (or program time) may be vary depending on a selected write operation approach. That is, in relation to various attributes of the NVM 220, since the PLM management module 215 selects and performs an optimal write manner in accordance with write analysis results derived from analyzing one or more metric(s), the first, second and third write times tPROG1, tPROG2, and tPROG3 may be respectively varied to have the same value or different values.

In some embodiments, the a residual time (t_residue) may be obtained by subtracting time required for the first data write operation and the second data write operation within the deterministic window DTWIN (e.g., t_residue=DTWIN−tPROG1−tPROG2). Accordingly, when a write time tPROG3_request required for writing the third data is equal to or less than the residue time (tPROG3_request≤t_residue), the third data may be written using the normal write mode.

In some embodiments, when the write time tPROG3_request required for writing the third data is greater than the residual time (tPROG3_request>t_residue), the storage controller 210 may write the data in the NVM 220 in a low level cell mode write or a compressed write mode within the residual time. Thereafter, the storage controller 210 may migrate the data by performing another write operation, which may be performed after performing an urgent background operation during the non-deterministic window NDWIN, in a high level cell mode write. Alternately, in some embodiments, the write data may be written with compression (S160) may be decompressed at the non-deterministic window and corrected in an existing high level cell state.

Figure 11:
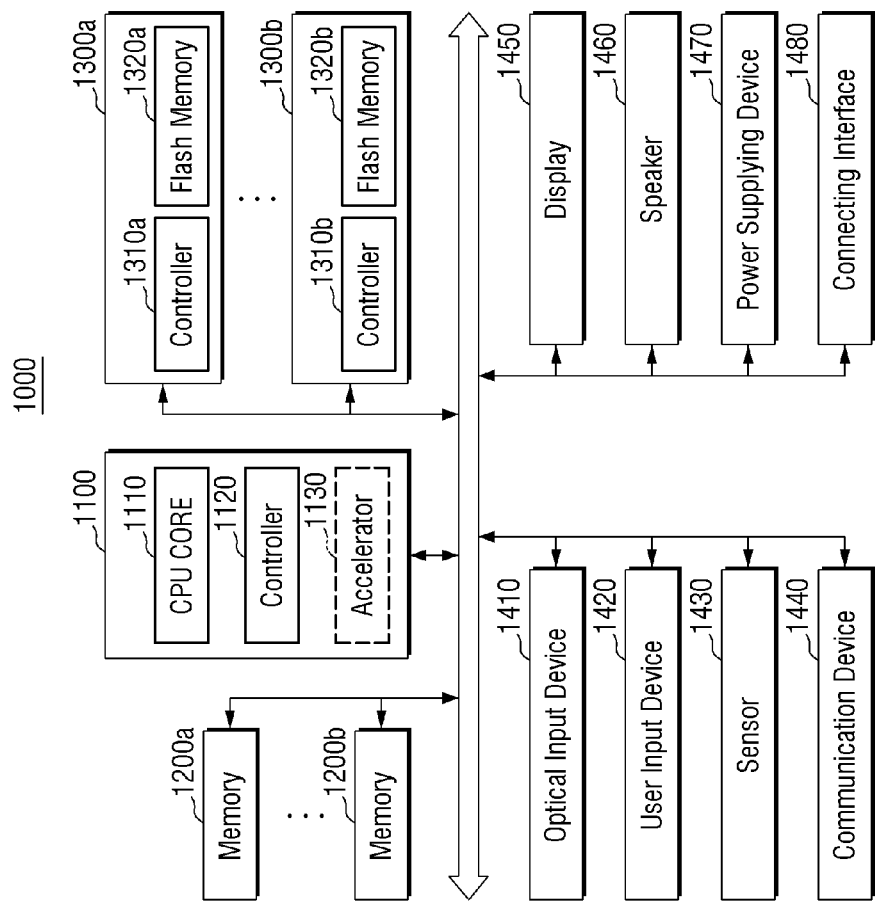
FIG. 11 is a block diagram illustrating an electronic system incorporating a storage system according to embodiments of the inventive concept.

FIG. 11 is a block diagram illustrating an electronic system 1000 which may incorporate a storage system according to some embodiments of the inventive concept. Here, the electronic system 1000 may be a mobile system such as a mobile phone, a smart phone, a tablet personal computer (PC), a wearable device, a healthcare device, or an Internet of things (IOT) device. However, the electronic system 1000 of FIG. 11 is not necessarily limited to the mobile system, and may instead be a personal computer, a laptop computer, a server, a media player, or automotive device such as a navigator.

Referring to FIG. 11, the electronic system 1000 may include a main processor 1100, memories 1200*a* and 1200*b*, and storage devices 1300*a* and 1300*b*, and may further include one or more of an image capturing device 1410, a user input device 1420, a sensor 1430, a communication device 1440, a display 1450, a speaker 1460, a power supplying device 1470 and a connecting I/F 1480.

The main processor 1100 may control the overall operation of the electronic system 1000, in more detail the operation of other elements constituting the electronic system 1000. The main processor 1100 may be implemented as a general purpose processor, a dedicated processor, or an application processor.

The main processor 1100 may include one or more CPU cores 1110, and may further include a controller 1120 for controlling the memories 1200*a* and 1200*b* and/or the storage devices 1300*a* and 1300*b*. In accordance with the embodiment, the main processor 1100 may further include an accelerator 1130 that is a dedicated circuit for high-speed data computation such as artificial intelligence (AI) data computation. The accelerator 1130 may include a graphics processing unit (GPU), a neural network processing unit (NPU), and/or a data processing unit (DPU), and may be implemented as a separate chip physically independent from other elements of the main processor 1100.

The memories 1200*a* and 1200*b* may be used as main memory devices of the electronic system 1000, and may include a volatile memory such as an SRAM and/or a DRAM but may also include a non-volatile memory such as a flash memory, a PRAM, and/or an RRAM. The memories 1200*a* and 1200*b* may be implemented in the same package as the main processor 1100.

The storage devices 1300*a* and 1300*b* may serve as non-volatile storage devices for storing data regardless of whether power is supplied, and may have a storage capacity relatively greater than that of the memories 1200*a* and 1200*b*. The storage devices 1300*a* and 1300*b* may include storage controllers 1310*a* and 1310*b* and non-volatile memories (NVM) 1320*a* and 1320*b* for storing data under the control of the storage controllers 1310*a* and 1310*b*. The non-volatile memories 1320*a* and 1320*b* may include a flash memory having a 2D structure or a 3D structure (e.g., a vertical NAND (or V-NAND) structure). Alternately or additionally, the non-volatile memories 1320*a* and 1320*b* may include other types of non-volatile memories such as PRAM and/or RRAM.

The storage devices 1300*a* and 1300*b* may be included in the electronic system 1000 in a physically separated state from the main processor 1100, and may be implemented in the same package as the main processor 1100. In addition, the storage devices 1300*a* and 1300*b* may be detachably coupled to other elements of the electronic system 1000 through an interface, such as a connecting I/F 1480 that will be described later, by having the same form as that of a solid state device (SSD) or a memory card. Such storage devices 1300*a* and 1300*b* may be, but are not limited to, devices to which standard protocols such as Universal Flash Storage (UFS), embedded Multi-Media Card (eMMC), or Non-Volatile Memory express (NVMe) are applied.

The image capturing device 1410 may capture a still image or a video, and may be a camera, a camcorder and/or a webcam.

The user input device 1420 may receive various types of data input from a user of the electronic system 1000, and may be a touch pad, a keypad, a keyboard, a mouse and/or a microphone.

The sensor 1430 may sense various types of physical quantities that may be acquired from the outside of the electronic system 1000, and may convert the sensed physical quantities into an electrical signal. The sensor 1430 may be a temperature sensor, a pressure sensor, an illuminance sensor, a position sensor, an acceleration sensor, a biosensor and/or a gyroscope sensor.

The communication device 1440 may perform transmission and reception of signals between other devices outside the electronic system 1000 in accordance with various communication protocols. Such a communication device 1440 may be implemented by including an antenna, a transceiver and/or a modem.

The display 1450 and the speaker 1460 may serve as output devices that output visual information and auditory information to a user of the electronic system 1000, respectively.

The power supplying device 1470 may appropriately convert power supplied from an external power source and/or a battery (not shown) embedded in the electronic system 1000 to supply the converted power to each element of the electronic system 1000.

The connecting I/F 1480 may provide connection between the electronic system 1000 and an external device connected to the electronic system 1000 to exchange data with the electronic system 1000. The connecting I/F 1480 may be implemented in a variety of I/F modes such as Advanced Technology Attachment (ATA), Serial ATA (SATA), external SATA (e-SATA), Small Computer Small Interface (SCSI), Serial Attached SCSI (SAS), Peripheral Component Interconnection (PCI), PCI express (PCIe), NVM express (NVMe), IEEE 1394, universal serial bus (USB), Secure Digital (SD) card, Multi-Media Card (MMC), embedded multi-media card (eMMC), Universal Flash Storage (UFS), embedded Universal Flash Storage (eUFS), and Compact Flash (CF) card interface.

Although the embodiments of the inventive concept have been described with reference to the accompanying drawings, it will be apparent to those skilled in the art that the inventive concept can be manufactured in various forms without being limited to the above-described embodiments and can be embodied in other specific forms without departing from the scope of the inventive concept, as defined by the following claims.

What is claimed is:

1. An operating method for a storage controller in a storage system including a non-volatile memory (NVM), the operating method comprising:
   receiving a write command defining a write operation in accordance with a predictable latency mode of the storage system that defines a deterministic window and a non-deterministic window;
   determining that the write operation is performed during the deterministic window;
   upon determining that the write operation is performed during the deterministic window, determining that an urgent background operation is not pending in the NVM, and upon determining that the urgent background operation is not pending in the NVM, performing the write operation using a normal write mode; or
   upon determining that the write operation is performed during the deterministic window, determining that the urgent background operation is pending in the NVM, analyzing a metric associated with the NVM to generate metric analysis results, selecting a write operation approach from among a plurality of write operation approaches using the metric analysis results to define a selected write operation approach; and
   performing the write operation using the selected write operation approach.

2. The operating method of claim 1, wherein the metric is one of a program/erase cycle, a read count, an operating temperature, a usage time, a resource level, a read recovery execution time, a program execution time, a deterministic window time, and a deterministic window read/write value.

3. The operating method of claim 1, further comprising:
   upon determining that the urgent background operation is pending in the NVM:
   analyzing the metric associated with the NVM to generate the metric analysis results, selecting the write operation approach from among the plurality of write operation approaches using the metric analysis results, and performing the write operation using the selected write operation approach.

4. The operating method of claim 1, wherein the plurality of write operation approaches includes at least one of: an acceleration write mode using write data compression, a single level write mode, a multi-level write mode, a lower level cell write mode, a higher level cell write mode, a compressed write mode, and a normal write mode.

5. The operating method of claim 1, further comprising:
   determining a residual time associated with execution of the write operation during the deterministic window.

6. The operating method of claim 5, further comprising:
   determining a first off set;
   determining a second off set; and
   comparing the residual time to the first offset and the second offset,
   wherein, in response to the residual time being less than the first offset, the selected write operation approach is a lower level cell write mode; and
   wherein, in response to the residual time being less than the second offset, the selected write operation approach is one of a single level write mode and a compressed write mode.

7. The operating method of claim 6, wherein, in response to the selected write operation approach being the compressed write mode, the write operation is performed during a following non-deterministic window.

8. The operating method of claim 1, further comprising:
   migrating data written to the NVM by performing the write operation during a following non-deterministic window.

9. A storage system comprising:
   a non-volatile storage device; and
   a storage controller configured to control execution of memory access operations by a non-volatile memory (NVM) during a deterministic window defined in relation to a predictable latency mode of the storage system that defines the deterministic window and a nondeterministic window,
   wherein the storage controller is further configured to:
   analyze a metric associated with the NVM and a memory access operation among the memory access operations to generate metric analysis results,
   select an optimal memory access operation approach from a plurality of memory access operation approaches using the metric analysis results,
   upon determining that the memory access operation is performed during the deterministic window, determine if there is an urgent background operation pending in the NVM, and
   in response to determining that there is an urgent background operation pending in the NVM, perform the memory access operation using the selected optimal memory access operation approach, or
   in response to determining that there is no urgent background operation pending in the NVM, perform the memory access operation using a normal write mode.

10. The storage system of claim 9, wherein the storage controller is further configured to monitor a residual time associated with execution of the memory access operation during the deterministic window.

11. The storage system of claim 9, wherein the metric is one of a program/erase cycle, a read count, an operating temperature, a usage time, a resource level, a read recovery execution time, a program execution time, a deterministic window time, and a deterministic window read/write value.

12. The storage system of claim 9, wherein the storage controller is further configured to:
    perform another memory access operation that is a read operation during the deterministic window to generate read data, determine whether the read data includes an uncorrectable error, upon determining that the read data includes an uncorrectable error, analyze the metric associated with the NVM and the read operation to generate the metric analysis results, and select a read operation approach from a plurality of read operation approaches using the metric analysis results.

* * * * *